United States Patent [19]

Munk et al.

[11] 3,975,127

[45] Aug. 17, 1976

[54] APPARATUS FOR MAKING SHAPED ARTICLES

[75] Inventors: Edmund Munk; Herbert Haas, both of Oberstenfeld, Germany

[73] Assignee: Furnier-Und Sperrholzwerk J. F. Werz, Jr. KG Werzalit-Pressholzwerk, Oberstenfeld, Germany

[22] Filed: Feb. 5, 1975

[21] Appl. No.: 547,448

[52] U.S. Cl. .............................. 425/193; 425/357; 425/407; 425/416; 425/422

[51] Int. Cl.[2] .............................. B29J 5/08

[58] Field of Search ........... 425/357, 358, 359, 406, 425/407, 408, 414, 415, 416, 422, 193, 195

[56] References Cited

UNITED STATES PATENTS

| | | | |
|---|---|---|---|
| 3,049,784 | 8/1962 | Cullen | 425/414 |
| 3,166,789 | 1/1965 | Schonenberger | 425/414 X |
| 3,534,439 | 10/1970 | Haas et al. | 425/422 X |
| 3,632,276 | 1/1972 | Munk | 425/415 |
| 3,764,243 | 10/1973 | Gambill et al. | 425/408 X |
| 3,868,209 | 2/1975 | Howell | 425/408 X |
| 3,897,190 | 7/1975 | Bingburg et al. | 425/406 X |

*Primary Examiner*—J. Howard Flint, Jr.
*Attorney, Agent, or Firm*—Michael J. Striker

[57] ABSTRACT

A mixture of fibrous material and a thermosetting binder is pressed in unheated state at a working station to convert it into a semi-finished body having approximately the shape and size of the desired shaped article, and thereupon the semi-finished body is pressed at the same working station but under application of heat, in order to convert it into the desired shaped article while setting the thermosetting binder.

12 Claims, 3 Drawing Figures

APPARATUS FOR MAKING SHAPED ARTICLES

BACKGROUND OF THE INVENTION

The present invention relates to a making of shaped articles from a mixture composed of fibrous material and a thermosetting binder. More particularly, the invention relates to an apparatus for making such shaped articles.

The making of shaped articles having a profiled configuration from mixtures of this type is already known in the art. Conventionally (and it should be noted that the following mixture compositions can also be used in the present invention) various types of fibrous materials such as lignocellulose fibrous materials including wood chips, sugarcane fibers or the like, are mixed with a thermosettable synthetic plastic resin, such as melamine, ureaformaldehide or phenolformaldehyde. It is also known to use other types of fibrous materials, such as glass fibers, rock wool or asbestos fibers, or to use any of these fibers in various combinations with one another and in admixture with a thermosetting binder.

The prior art teaches to fill the mixture into a preliminary mold to a thickness corresponding to approximately 6–10 times the thickness desired for the finished profiled or shaped body. Thereupon, the mixture is compressed in the preliminary mold in cool condition and to such an extent that it forms a blank having almost the shape and dimensions of the desired shaped article. This blank is then removed from the preliminary mold and, since it has only been cold pressed and the thermosetting binder has not hardened, the blank tends to expand as soon as it is removed from the preliminary mold, but only to a relatively slight extent; this is known as swelling or breathing of the blank. The blank swells to such an extent that its exterior dimensions are about 10–20% larger than the dimensions which are required for the finished shaped article. The blank is thereupon inserted into an appropriately shaped and dimensioned cavity of a hot-pressing mold and is again compressed under application of heat, until it assumes the shape and dimensions required for the finished article, and during this hot-pressing operation the thermosetting binder sets and hardens. During the hot-pressing operation, the shaped body may also be provided with a decorative cover layer that is pressed onto its surface, if desired.

This method of making shaped bodies from mixtures of the type in question, and the equipment for carrying out the method, is very widely used for the manufacture of large bodies, such as tabletops, wall mouldings and the like. In the manufacture of these articles, it is of little or no economic importance that the cold pressing and the subsequent hot pressing are carried out in separate and entirely independent steps, and that in between these steps the cold-pressed blanks swell to some extent for the reasons and in the manner described earlier.

However, when relatively small shaped bodies are produced, for instance decorative grilles, circular members or the like, these two factors become of very considerable importance. The prices at which such relatively small articles can be sold are such that the labor-intensive prior method requiring two separate and distinct pressing steps, frequently makes the operation economically impractical. A different disadvantage, or sometines an additional one, may also be the fact that the swelling that takes place in the blanks after the cold pressing and before the hot pressing step, is often objectionable in small shaped articles since they can no longer be precisely inserted into the mold cavity or cavities of the hot-pressing mold, so that the article obtained by completing of the hot-pressing operation will be of inferior quality and may have flashings due to improper fit in the cavity of the hot-pressing mold.

SUMMARY OF THE INVENTION

It is an object of the invention to overcome the aforementioned problems as they pertain in particular to relatively small shaped articles made from mixtures of fibrous material and thermosetting binder.

More particularly, it is an object of the invention to provide an improved apparatus which avoids the aforementioned disadvantages.

A further object is for the apparatus to be more economical than the teachings of the prior art.

A concomitant object is for the apparatus to provide fewer technical problems than the prior art and to make it possible to produce shaped articles of higher quality than heretofore possible.

In keeping with these objects, and with others which will become apparent hereafter, one feature of the invention resides in an apparatus for making shaped articles from a mixture of fibrous material with a thermosetting binder.

Briefly stated, this apparatus operates by pressing the mixture in unheated state at a working station to convert it into a semi-finished body having approximately the shape and size of the desired shaped article, and by thereupon pressing the semi-finished body at the same working station as before, and under application of heat, in order to convert the semi-finished body into the desired shaped article while setting the binder.

In other words, it is now no longer necessary to carry out the cold-pressing operation, remove the cold-pressed blanks from the cold-pressing mold, transport them to another location where the hot-pressing mold is located, insert them into the hot-pressing mold and subject them to hot pressing. The present invention greatly simplifies this and therefore is substantially more economical and also avoids the technical problems encountered in the prior art, as will be explained subsequently.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

The novel apparatus will be explained on hand of a single exemplary embodiment, and the operation thereof will be explained in conjunction with the description of the apparatus.

Figure 1:
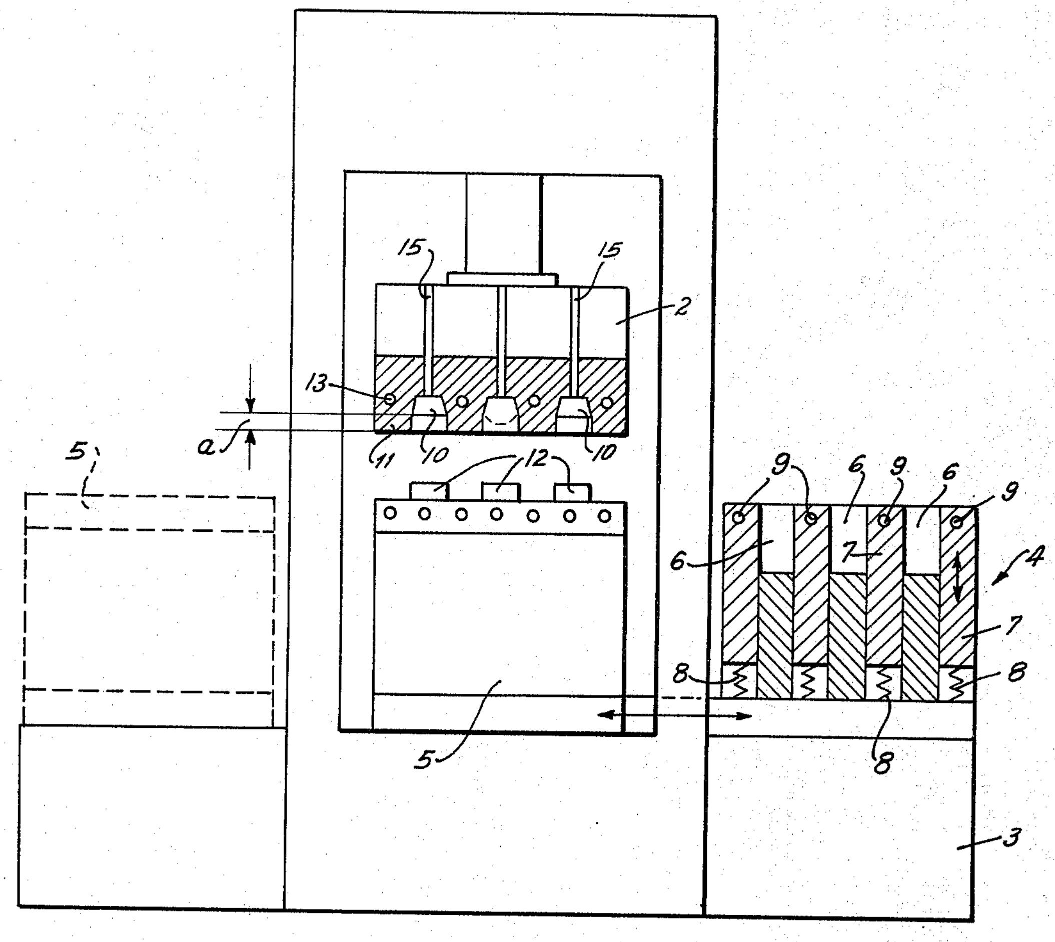
FIG. 1 is a diagrammatic slide view illustrating an embodiment of an apparatus for carrying out the invention.

FIG. 1 shows the novel apparatus which has a prepressing or cold-pressing mold 4 and a hot-pressing mold 5. The molds 4 and 5 constitute lower mold sections either of which can cooperate with an upper mold section 2 that can move up and down in the frame 1 of a press, for example by means of the diagrammatically illustrated ram which may be of the hydraulically operated type. The lower mold sections 4 and 5, on the other hand, move in horizontal direction (as indicated by the double-headed arrow in FIG. 1) so that they each can move beneath the upper mold section 2 (at which time the respectively other lower mold section is laterally displaced with respect to the upper mold section 2). For example, when the cold-pressing mold section 4 is located beneath the mold section 2, the hot-pressing mold section 5 will assume the laterally displaced broken-line position shown in FIG. 1, and vice versa.

The cold-pressing lower mold section 4 is illustrated in FIG. 1 in diagrammatic form and in the position which it will assume when it is ready to receive a mixture of fibrous material and a thermosetting binder. It will be seen to have an outer frame 7 which forms together with a stationary part 14 one or more (here a plurality) of spaces 6 each of which is to be filled with the mixture to be molded. The frame 7 can move up and down and is supported by the springs 8 so that it is permanently urged in upward direction. Of course, in lieu of the springs 8 one of the known devices for raising and lowering the frame 7 relative to the stationary part 14 can also be employed; such devices are know per se to those skilled in the art. Normally, they are in form of single-acting or double-acting hydraulic or pneumatic cylinders. Of course, if single-acting cylinders are used, then separate cylinders are required for raising the frame, and others are needed for lowering it. The downward movement of frame 7 when the mold 2 is lowered onto it, is effected by the pressure of mold 2; therefore, only single-acting cylinders need be provided for this function.

The lower mold section 4 may be cooled, for which purpose it may be provided with bores 9 through which a cooling fluid, such as water, may be circulated in known manner via a pump and flexible hoses.

The upper mold section 2 is formed in its downwardly directed surface with plurality of depressions or recesses 10 corresponding to the shape which is to be assumed by the respective finished articles. Each of these depressions 10 has an extension 11 which does not participate in the shaping of the articles.

The hot-pressing lower mold section 5 is formed in an upwardly directed surface with projections 12 each of which is receivable in and completely fills one of the extensions 11. Both the upper mold section 2 and the hot-pressing mold section 5 are provided with bores 13 for circulation of a heating fluid, such as pressurized hot water, oil or steam, or with other heating means such as embedded electrical resistance heaters. Heating fluid is circulated via a pump and flexible pressure hoses through the bores 13.

Figure 2:
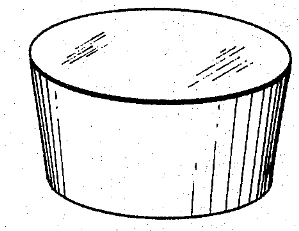
FIG. 2 is a perspective view illustrating a relatively small finished shaped article that can be produced in accordance with the present invention.

To produce a plurality of shaped articles in accordance with the invention, for instance articles having the shape shown in FIG. 2 or any other appropriate shape, the spaces 6 are filled with the fiber-binder mixture so that they are completely filled up; this is done while the lower mold section 4 is in the position shown in FIG. 1. It is self-evident that only a single space 6 could be provided, rather than a plurality, although from the point of view of production economy, the latter will normally be the case. After the spaces 6 are completely filled with the mixture to be compressed, the lower mold section 4 is horizontally shifted (towards the left in FIG. 1) until each of the spaces 6 registers in vertical direction with one of the depressions 10 of the upper mold section 2. The upper mold section 2 is now lowered and as soon as it contacts the frame 7, it begins to push the latter downwardly against the springs 8. The upper mold section 2, of course, exerts a downward pressure, and the continued lowering of the frame 7 (during which the stationary part 14, of course, remains without movement) the mixture in the spaces 6 becomes progressively compressed and is ultimately forced in compressed condition into the depressions 10. The upper mold section 2 is moved (and made to exert pressure) by a suitable device, for example a hydraulic or pneumatic ram of the double-acting type, or two of them of the single-acting type in which case one serves for raising and the other for lowering of the mold section 2.

Figure 1A:
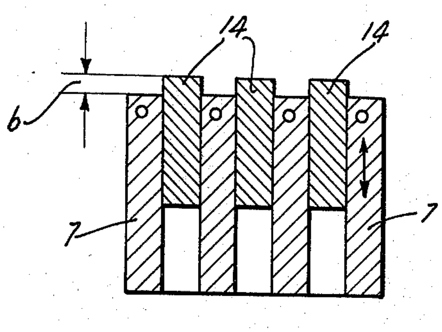
FIG. 1*a* is a diagrammatic side view showing the cold-pressing mold of the apparatus in FIG. 1, in a position which it assumes at the end of the cold-pressing operation.

When the upper mold section 2 has reached its lowest position, the frame 7 of the lower mold section 4 will have assumed the position relative to the stationary part 14 that is shown in FIG. 1*a*.

During this cold-pressing operation involving the cold-pressing lower mold section 4, the hot-pressing lower mold section 5 is in the position in broken lines in FIG. 1. After the cold-pressing operation is completed, the upper mold section 2 is raised again to the position shown in FIG. 1. In doing so, it carries with it the pre-pressed bodies or blanks which have been formed in the depressions 10 and which are retained therein by friction, due to the fact that as soon as the downward pressure of the mold section 2 is released, the material of each of the blanks expands or swells in the manner described earlier and thus presses against the wall bounding the depression 10 in which it is received, Of course, this is not disadvantageous because the respective blank cannot increase its dimensions except in direction outwardly of the respective depression 10 and into the extension 11, as is shown by the curved line in the center one of the extensions 11.

In fact, the expansion is helpful because in the present invention it is utilized for automatic withdrawal of the blanks from the mold section 4. It is clear from this that no separate step of removing the cold-pressed semi-finished bodies from the cold-pressing tool, and supplying them to the hot-pressing tool, is required in accordance with the present invention, because the semi-finished bodies are simply retained in the depression 10 of the upper mold section 2 when the latter moves upwardly upon completion of the cold-pressing operation.

The lower mold section 4 is now shifted to the right in FIG. 1, back to the illustrated position, and the lower hot-pressing mold section 5 moves to the position vacated by the mold section 4. It is clear that there is a single working station, namely the location assumed by the mold sections 4 or 5, respectively, when they cooperate with the mold section 2. As soon as the mold section 5 is located at this working station, the mold section 2 is lowered again and the projections 12 enter into the extensions 11 and now compress the semi-finished blanks in the respective depressions 10, which blanks have swelled into the extensions 11 in the manner indicated by the curved line in the center one of the extensions 11 until the upper face of each of the projections 12 is flush with the bottom end of the respectively associated depression 10. During this operation, the mold sections 2 and 5 are heated, so that the heat transmitted to the blanks in the depressions 10 causes their thermosetting binder to harder, with the result that on completion of the hot-pressing operation each of the depressions 10 contains a finished shaped article. These are now expelled by pneumatic, hydraulic or mechanical rams 15 or the like, and the apparatus is ready for the next production cycle.

The finished shaped article shown in FIG. 2 is by way of example only. The articles of FIG. 2, usually provided with a center bore, may be used as a centering cone for winding bodies on which paper webs or the like are to be wound, and such articles must be produced in large quantities and in a very economic manner. The present invention makes it possible to produce, e.g., 50–100 of these articles simultaneously, so that a very large production per unit time can be obtained when it is considered that the apparatus according to the present invention can perform approximately 50 complete operating cycles per hour. An operating cycle includes, of course, the filling of the mixture into the spaces 6, the movement of the mold section 4 into registry with the mold section 2, the lowering of the mold section 2 to obtain the cold pressing of the semi-finished blanks, the raising of the mold section 2, the movement of the mold section 5 into registry with the mold section 2, the lowering of the mold section 2 for the hot-pressing operation, the raising of the mold section 2 and the expelling of the finished articles from the mold section 2. The molding pressure may vary between about 30 and 150 $kg/cm^2$ depending upon the material, the shape and the desired characteristics of the finished articles. Molding time may fluctuate between substantially 10 seconds (for production of the type of article shown in FIG. 2 having a thickness of 2 mm) and 10 minutes (for articles having a thickness of about 10 cm); it depends upon the desired density and the thickness of the material change which becomes converted into an article.

The temperature may range between 120° and 200°C; binder materials may be urea resins, phenolic resins, polyester, melamin resins, etc. It goes without saying that the mold sections 4 and 5 may be connected with one another, either directly or indirectly, to move in unison so that as one of them moves into registry with the mold section 2, the other will simultaneously move to a laterally offset position, and vice versa. Appropriate drive means will also be provided for this purpose, and for raising and lowering the mold section 2. However, such means are, of course, well known and are not believed to require a detailed description to enable those skilled in the art to make use of this invention. The mold sections 4 and 5 may, for example, be moved horizontally via chains or rack and pinion drives and are supported on rails via rollers provided for this purpose. Hydraulic or pneumatic cylinder units can also be used to effect the horizontal movements of the mold sections 4 and 5, but mechanical drive means are currently preferred.

It should be understood that if articles of a more complex configuration than the one shown in FIG. 2 are to be produced, the semi-finished bodies having this general configuration could be produced in two or more cold-pressing steps, utilizing two or more cold-pressing molds 4 that cooperate with the mold 2.

It will be understood that each of the elements described above, or two or more together, may also find a useful application in other types of constructions differing from the type described above.

While the invention has been illustrated and described as embodied in the press molding of shaped articles it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an apparatus for making shaped articles from a mixture of fibrous material with a thermosetting binder, a combination comprising first means for pressing the mixture in unheated state at a working station to convert it into a semi-finished body having approximately the shape and size of said desired shaped article; and second means for pressing the semi-finished body at the same working station under application of heat, to convert the semi-finished body into the desired shaped article while setting said binder.

2. A combination as defined in claim 1 wherein said working station comprises a vertically movable upper mold section, said first means comprises a first lower horizontally movably cold-pressing mold section movable beneath said upper mold section and cooperating therewith to form said semi-finished body, and said second means comprises a second lower hot-pressing mold section horizontally movable beneath said upper mold section in place of said first lower mold section and cooperating with said upper mold section to convert the semi-finished body into said shaped article.

3. A combination as defined in claim 2, wherein said second means comprises heating means for heating at least said second lower mold section.

4. A combination as defined in claim 2, wherein said first means comprises cooling means for cooling at least said first lower mold section.

5. A combination as defined in claim 2, wherein said first and second lower mold sections are connected for to-and-fro reciprocating movement so that one of them is always laterally offset from said upper mold section when the other is located beneath said upper mold section, and vice versa.

6. A combination as defined in claim 2, wherein said upper mold section has a downwardly directed surface formed with a mold recess into which said mixture is pressed by operation of said first means to form the cold-pressed semi-finished body which expands on termination of pressure to be retained in said recess by friction.

7. A combination as defined in claim 6, wherein said second lower mold section has an upper surface formed with a projection dimensioned to enter said recess and form said body to the size and shape of the desired finished article.

8. In an apparatus for making shaped articles from a mixture of fibrous material with a thermosetting binder, a combination comprising a vertically-movable upper mold section having a downwardly directed surface formed with a plurality of recesses; a first horizontally-movable lower mold section mounted for to-and-fro reciprocating movement between respective positions in which said first lower mold section is laterally offset from and located directly beneath said uper mold section; means for cold-pressing the mixture in unheated state at a working station to convert the mixture into a plurality of semi-finished bodies having approximately the shape and size of the desired shaped articles when said first lower mold section is located directly beneath said upper mold section; a second horizontally-movable lower mold section having an upper surface formed with a plurality of projections, said second lower mold section being connected with said first lower mold section for reciprocally moving with the latter, said second lower mold section being always laterally offset from said upper mold section when said first lower mold section is located directly beneath said upper mold section, and vice versa; and means for hot-pressing the semi-finished bodies at said same work station upon application of heat when said second lower mold section is located directly beneath said upper mold section by causing said projections to respectively enter said recesses, for converting each of the semi-finished bodies into the desired shaped article while setting the binder.

9. A combination as defined in claim 3, wherein said heating means includes a plurality of bores formed in said second lower mold section and through which a heating fluid is circulated.

10. A combination as defined in claim 4, wherein said cooling means includes a plurality of bores formed in said first lower mold section and through which a cooling fluid is circulated.

11. A combination as defined in claim 2, wherein said upper mold section has a downwardly directed surface formed with a plurality of mold recesses into which said mixture is pressed by operation of said first means so as to simultaneously form a plurality of the cold-pressed semi-finished bodies which expands on termination of pressure to be retained in said recesses by friction.

12. A combination as defined in claim 11, wherein said second lower mold section has an upper surface formed with a plurality of projections dimensioned to enter said recesses and form said bodies to the sizes and shapes of the desired finished articles.

* * * * *